US008599650B2

(12) United States Patent

Tokiwa et al.

(10) Patent No.: US 8,599,650 B2
(45) Date of Patent: Dec. 3, 2013

(54) MARKER DETECTING APPARATUS AND RADIO-CONTROLLED TIMEPIECE

(75) Inventors: Teruhisa Tokiwa, Kunitachi (JP); Takashi Sano, Fussa (JP)

(73) Assignee: Casio Computer Co., Ltd, Tokyo (JP)

( * ) Notice: Subject to any disclaimer, the term of this patent is extended or adjusted under 35 U.S.C. 154(b) by 183 days.

(21) Appl. No.: 13/171,658

(22) Filed: Jun. 29, 2011

(65) Prior Publication Data

US 2012/0014226 A1 Jan. 19, 2012

(30) Foreign Application Priority Data

Jul. 16, 2010 (JP) ................................ 2010-161159

(51) Int. Cl.
*G04C 11/00* (2006.01)
*H04L 7/00* (2006.01)

(52) U.S. Cl.
USPC ............................................ 368/47; 375/354

(58) Field of Classification Search
USPC ............................ 368/47; 713/500; 375/354
See application file for complete search history.

(56) References Cited

U.S. PATENT DOCUMENTS 3,684,964 A * 8/1972 Bright et al. ................. 375/316
6,339,600 B1 * 1/2002 Hazama ....................... 370/474
7,042,808 B2 * 5/2006 Saitoh ............................ 368/47
7,492,846 B2 * 2/2009 Kondo .......................... 375/354
7,555,029 B2 * 6/2009 Kondo .......................... 375/130
8,446,800 B2 * 5/2013 Abe ............................... 368/47
2005/0195690 A1 9/2005 Kondo
2006/0050824 A1 3/2006 Kondo
2006/0140282 A1 * 6/2006 Kondo .......................... 375/242

FOREIGN PATENT DOCUMENTS

EP 1 662 344 A2 5/2006
JP 2005-249632 9/2005
JP 2006-071318 3/2006

OTHER PUBLICATIONS

Extended European Search Report for European Application No. 11174075.9-1240 dated Mar. 16, 2012.

* cited by examiner

*Primary Examiner* — Sean Kayes
(74) *Attorney, Agent, or Firm* — Turocy & Watson, LLP

(57) ABSTRACT

A marker detecting apparatus includes: a signal input section where a time code signal is inputted; a level detecting section detecting a signal level of a pulse signal of the time code signal at points in a marker characteristic interval to detect a match between the pulse signal and an ideal marker pulse signal in the signal level; a first calculating section calculating a number of the detected matches so as to obtain a value thereof, and correlating the obtained value with a pulse position of the pulse signal, the pulse position being a same in any of frames of the time code signal; a second calculating section adding up the obtained values correlated with the pulse position in the frames; and a marker determining section determining at which pulse position in the frames a marker pulse signal is disposed, based on the added-up value.

8 Claims, 9 Drawing Sheets

| MEMORY NUMBER | A0 | A1 | A2 | A3 | A4 | A5 | A6 | A7 | A8 | A9 |
|---|---|---|---|---|---|---|---|---|---|---|
| MATCH-DETECTED NUMBER | 0 | 0 | 0 | 15 | 15 | 0 | 0 | 0 | 0 | 0 |
| MEMORY NUMBER | A10 | A11 | A12 | A13 | A14 | A15 | A16 | A17 | A18 | A19 |
| MATCH-DETECTED NUMBER | 0 | 0 | 0 | 15 | 0 | 0 | 0 | 0 | 0 | 0 |
| MEMORY NUMBER | A20 | A21 | A22 | A23 | A24 | A25 | A26 | A27 | A28 | A29 |
| MATCH-DETECTED NUMBER | 0 | 0 | 0 | 15 | 0 | 0 | 0 | 0 | 0 | 0 |
| MEMORY NUMBER | A30 | A31 | A32 | A33 | A34 | A35 | A36 | A37 | A38 | A39 |
| MATCH-DETECTED NUMBER | 0 | 0 | 0 | 15 | 0 | 0 | 0 | 0 | 0 | 0 |
| MEMORY NUMBER | A40 | A41 | A42 | A43 | A44 | A45 | A46 | A47 | A48 | A49 |
| MATCH-DETECTED NUMBER | 0 | 0 | 0 | 15 | 0 | 0 | 0 | 0 | 0 | 0 |
| MEMORY NUMBER | A50 | A51 | A52 | A53 | A54 | A55 | A56 | A57 | A58 | A59 |
| MATCH-DETECTED NUMBER | 0 | 0 | 0 | 15 | 0 | 0 | 0 | 0 | 0 | 0 |

FIG. 4

| MEMORY NUMBER | A0 | A1 | A2 | A3 | A4 | A5 | A6 | A7 | A8 | A9 |
|---|---|---|---|---|---|---|---|---|---|---|
| MATCH-DETECTED NUMBER | 0 | 0 | 0 | 15 | 15 | 0 | 0 | 0 | 0 | 0 |
| MEMORY NUMBER | A10 | A11 | A12 | A13 | A14 | A15 | A16 | A17 | A18 | A19 |
| MATCH-DETECTED NUMBER | 0 | 0 | 0 | 15 | 0 | 0 | 0 | 0 | 0 | 0 |
| MEMORY NUMBER | A20 | A21 | A22 | A23 | A24 | A25 | A26 | A27 | A28 | A29 |
| MATCH-DETECTED NUMBER | 0 | 0 | 0 | 15 | 0 | 0 | 0 | 0 | 0 | 0 |
| MEMORY NUMBER | A30 | A31 | A32 | A33 | A34 | A35 | A36 | A37 | A38 | A39 |
| MATCH-DETECTED NUMBER | 0 | 0 | 0 | 15 | 0 | 0 | 0 | 0 | 0 | 0 |
| MEMORY NUMBER | A40 | A41 | A42 | A43 | A44 | A45 | A46 | A47 | A48 | A49 |
| MATCH-DETECTED NUMBER | 0 | 0 | 0 | 15 | 0 | 0 | 0 | 0 | 0 | 0 |
| MEMORY NUMBER | A50 | A51 | A52 | A53 | A54 | A55 | A56 | A57 | A58 | A59 |
| MATCH-DETECTED NUMBER | 0 | 0 | 0 | 15 | 0 | 0 | 0 | 0 | 0 | 0 |

FIG. 5

| MEMORY NUMBER | A0 | A1 | A2 | A3 | A4 | A5 | A6 | A7 | A8 | A9 |
|---|---|---|---|---|---|---|---|---|---|---|
| MATCH-DETECTED NUMBER | 4 | 0 | 2 | 10 | 9 | 3 | 2 | 4 | 0 | 1 |
| MEMORY NUMBER | A10 | A11 | A12 | A13 | A14 | A15 | A16 | A17 | A18 | A19 |
| MATCH-DETECTED NUMBER | 2 | 2 | 0 | 8 | 1 | 3 | 3 | 2 | 4 | 0 |
| MEMORY NUMBER | A20 | A21 | A22 | A23 | A24 | A25 | A26 | A27 | A28 | A29 |
| MATCH-DETECTED NUMBER | 5 | 2 | 0 | 11 | 2 | 1 | 5 | 3 | 8 | 6 |
| MEMORY NUMBER | A30 | A31 | A32 | A33 | A34 | A35 | A36 | A37 | A38 | A39 |
| MATCH-DETECTED NUMBER | 2 | 5 | 1 | 14 | 0 | 2 | 1 | 1 | 2 | 1 |
| MEMORY NUMBER | A40 | A41 | A42 | A43 | A44 | A45 | A46 | A47 | A48 | A49 |
| MATCH-DETECTED NUMBER | 6 | 2 | 9 | 10 | 2 | 1 | 1 | 3 | 1 | 3 |
| MEMORY NUMBER | A50 | A51 | A52 | A53 | A54 | A55 | A56 | A57 | A58 | A59 |
| MATCH-DETECTED NUMBER | 5 | 1 | 6 | 11 | 1 | 5 | 2 | 3 | 3 | 1 |

FIG. 6

| MEMORY NUMBER | A0 | A1 | A2 | A3 | A4 | A5 | A6 | A7 | A8 | A9 |
|---|---|---|---|---|---|---|---|---|---|---|
| MATCH-DETECTED NUMBER | 18 | 10 | 25 | 80 | 70 | 12 | 25 | 18 | 16 | 30 |
| MEMORY NUMBER | A10 | A11 | A12 | A13 | A14 | A15 | A16 | A17 | A18 | A19 |
| MATCH-DETECTED NUMBER | 16 | 28 | 15 | 74 | 16 | 24 | 17 | 32 | 18 | 12 |
| MEMORY NUMBER | A20 | A21 | A22 | A23 | A24 | A25 | A26 | A27 | A28 | A29 |
| MATCH-DETECTED NUMBER | 25 | 24 | 12 | 70 | 10 | 16 | 22 | 21 | 12 | 21 |
| MEMORY NUMBER | A30 | A31 | A32 | A33 | A34 | A35 | A36 | A37 | A38 | A39 |
| MATCH-DETECTED NUMBER | 23 | 18 | 27 | 71 | 12 | 8 | 26 | 12 | 21 | 29 |
| MEMORY NUMBER | A40 | A41 | A42 | A43 | A44 | A45 | A46 | A47 | A48 | A49 |
| MATCH-DETECTED NUMBER | 21 | 12 | 9 | 73 | 11 | 12 | 25 | 21 | 24 | 25 |
| MEMORY NUMBER | A50 | A51 | A52 | A53 | A54 | A55 | A56 | A57 | A58 | A59 |
| MATCH-DETECTED NUMBER | 10 | 15 | 22 | 75 | 26 | 18 | 22 | 19 | 27 | 29 |

MARKER DETECTING APPARATUS AND RADIO-CONTROLLED TIMEPIECE

BACKGROUND OF THE INVENTION

1. Field of the Invention

The present invention relates to a marker detecting apparatus which detects marker signals of a time code signal, and to a radio-controlled timepiece including the marker detecting apparatus.

2. Description of the Related Art

Conventionally, there is known a radio-controlled timepiece which decodes a time code signal of a received standard radio wave (standard time and frequency signal) so as to obtain time information. Furthermore, there are known various technologies by which a time code signal can be accurately decoded even under a poor reception environment.

For example, Japanese Patent Application Laid-open Publication No. 2006-071318 (which corresponds to US 2006/0050824 A1) discloses a technology by which a time code signal is sampled at a prescribed frequency while the sampling data is subjected to convolutional waveform addition on a one-minute cycle, and the decoding process is performed based on the data.

Furthermore, Japanese Patent Application Laid-open Publication No. 2005-249632 (which corresponds to US 2005/0195690 A1) discloses a technology by which a time code signal is sampled at 50 ms intervals so as to be stored, and it is judged which code the sampling data shows by calculating a matching score between the sampling data and a temperate pattern.

For example, in order to find a minute synchronization point for x min. 00 sec. (the "x" is an arbitrary value) of a time code signal, it is necessary to detect marker signals which represent positions in a frame of the time code signal. The marker signals are always disposed at positions of 0 sec., 9 sec., 19 sec., 29 sec., 39 sec., 49 sec., and 59 sec. in a frame of a time code signal, respectively. Therefore, it is expected that the influence of noise can be reduced, and hence, the marker signals can be accurately detected, by subjecting the sampling data of a plurality of frames of the time code signal to the convolutional waveform addition on a one-minute cycle, and determining the marker signals based on the data as disclosed in Japanese Patent Application Laid-open Publication No. 2006-071318.

However, storing all the sampling data of the time code signal as it is and/or performing the waveform addition by using all the sampling data require a very large memory capacity, and also increase a load of an arithmetic process.

The present invention provides a marker detecting apparatus and a radio-controlled timepiece which can accurately detect the marker signals even under a poor reception environment, and also can detect the marker signals with a relatively small memory capacity and a light load.

SUMMARY OF THE INVENTION

An aspect of the present invention is a marker detecting apparatus including: a signal input section to which a time code signal is inputted, the time code signal having a plurality of frames each of which includes a marker pulse signal and a non-marker pulse signal cyclically disposed, the marker pulse signal being disposed at a prescribed position in any of the frames so as to indicate the position; a level detecting section which, with regard to each of the pulse signals in each of the frames, detects a signal level of the pulse signal at a plurality of points included in a marker characteristic interval where an ideal marker pulse signal and an ideal non-marker pulse signal are different in the signal level, so as to detect a match between the pulse signal and the ideal marker pulse signal in the signal level; a first calculating section which, with regard to each of the pulse signals in each of the frames, calculates a match-detected number so as to obtain a value of the match-detected number which indicates a number of the matches detected by the level detecting section, and correlates the obtained value with a pulse position of the pulse signal, the pulse position being a same in any of the frames; a second calculating section which, with regard to each of the pulse positions, adds up the obtained values of the match-detected number of the frames; and a marker determining section which determines at which pulse position in the frames the marker pulse signal is disposed, based on the added-up value of the match-detected number correlated with each of the pulse positions.

BRIEF DESCRIPTION OF THE DRAWINGS

FIG. 4 is a table showing a result of the marker signal detecting process performed on one frame of an ideal time code signal;

FIG. 5 a table showing an exemplary result of the marker signal detecting process performed on one frame of a normal time code signal which includes noise;

FIG. 6 is a table showing an exemplary result of the marker signal detecting process performed on six frames of the normal time code signal;

DESCRIPTION OF THE PREFERRED EMBODIMENT

In the following, an embodiment of the present invention is described with reference to the accompanying drawings.

Figure 1:
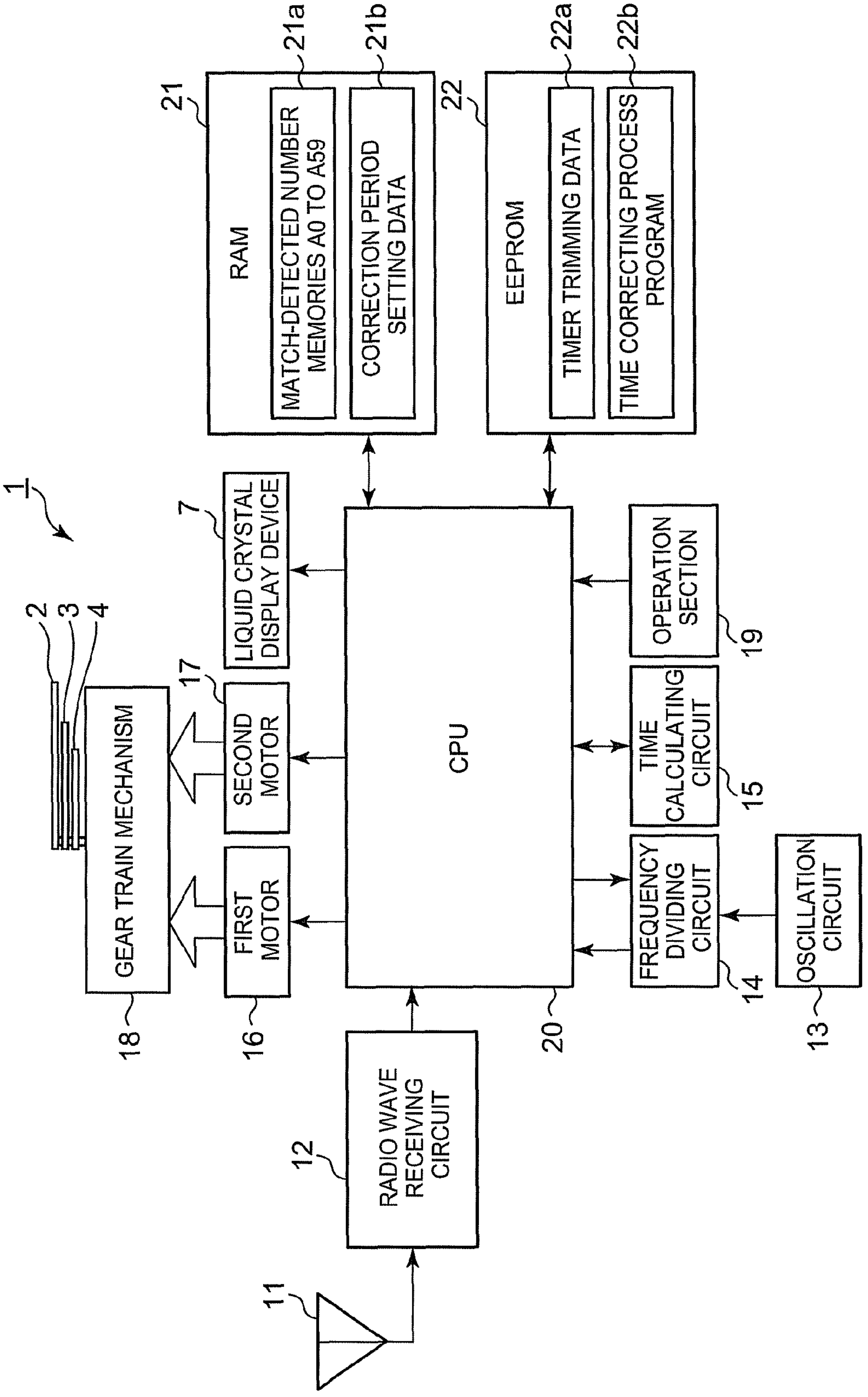
FIG. 1 is a block diagram showing the overall structure of a radio-controlled timepiece according to an embodiment of the present invention.

FIG. 1 is a block diagram showing the overall structure of a radio-controlled timepiece 1 according to an embodiment of the present invention.

The radio-controlled timepiece 1 according to the embodiment is an electronic timepiece having a function of receiving a standard radio wave including a time code so as to automatically correct the time. The radio-controlled timepiece 1 displays the time by hands (a second hand 2, a minute hand 3, and an hour hand 4) which revolve on a dial plate, and by a liquid crystal display device 7 which is disposed on the dial plate, and displays various information.

As shown in FIG. 1, the radio-controlled timepiece 1 includes an antenna 11 which receives the standard radio wave, a radio wave receiving circuit (radio wave receiving section) 12 which demodulates the standard radio wave so as to generate a time code signal, an oscillation circuit 13 and a frequency dividing circuit 14 as a timer circuit which generates various timing signals, a time calculating circuit (time calculating section) 15 which calculates the current time, a first motor 16 which drives the second hand 2 to revolve, a second motor 17 which drives the minute hand 3 and the hour hand 4 to revolve, a gear train mechanism 18 which transmits the rotational driving force of the first motor 16 and the second motor 17 to their respective hands, an operation section 19 having a plurality of operation buttons, the operation section 19 through which an operation command is inputted from outside, a CPU (Central Processing Unit) 20 which controls the radio-controlled timepiece 1 as a whole, a RAM (Random Access Memory) 21 which provides a memory space for the CPU 20 to work, and an EEPROM (Electrically Erasable Programmable Read-Only Memory) 22 which stores pieces of control data and control programs. A marker detecting apparatus according to the embodiment of the present invention is composed of the CPU 20, the RAM 21, and the EEPROM 22.

The first motor 16 and the second motor 17 are stepping motors. The first motor 16 drives the second hand 2 to revolve stepwise, and the second motor 17 drives the minute hand 3 and the hour hand 4 to revolve stepwise, independently from each other. On a normal condition to display the time, the first motor 16 is driven one step every one second so as to drive the second hand 2 to make one revolution in one minute. The second motor 17 is driven one step every 10 seconds so as to drive the minute hand 3 to make one revolution in 60 minutes, and to drive the hour hand 4 to make one revolution in 12 hours.

The radio wave receiving circuit 12 includes an amplifier which amplifies a signal received by the antenna 11, a filter which extracts only a frequency content corresponding to the standard radio wave from the received signal, a demodulator which demodulates the received signal so as to extract a time code signal, the received signal of which the amplitude is modulated, and a comparator which performs waveform shaping on the time code signal so as to make the time code signal a signal of a high level and a low level, and outputs the signal outsides. Although not particularly limited, the radio wave receiving circuit 12 is configured as a low active output by which the output is a low level when the amplitude of the standard radio wave is large, and the output is a high level when the amplitude of the standard radio wave is small. The time code signal outputted from the radio wave receiving circuit 12 is inputted to an I/O circuit (signal input section) of the CPU 20, so that the CPU 20 detects the signal level of the time code signal.

The frequency dividing circuit 14 is capable of changing a value of the frequency-dividing ratio to another value thereof when receiving a command from the CPU 20. Furthermore, the frequency dividing circuit 14 is capable of outputting various timing signals to the CPU 20 in parallel. For example, the frequency dividing circuit 14 generates a one-second cycle timing signal and supplies the signal to the CPU 20 in order to update time calculation data of the time calculating circuit 15 on a one-second cycle, while generating a sampling-frequency timing signal and supplying the signal to the CPU 20 when taking in a time code signal outputted from the radio wave receiving circuit 12.

The oscillation circuit 13 oscillates at a prescribed frequency so as to output an oscillation signal having the oscillating frequency. There is a small error between the value of the oscillating frequency and a designed value thereof. With regard to the radio-controlled timepiece 1 according to the embodiment of the present invention, in setting prior to marketing, the error of the oscillation circuit 13 is calculated, and a value of the error is stored in the EEPROM 22 as timer trimming data 22*a*.

In the EEPROM 22, the timer trimming data 22*a* is stored as a piece of the control data. That is, the EEPROM 22 functions as an error information storing section which stores error information. In addition, as the control programs, a time displaying process program by which the current time is calculated while the current time is displayed by driving the hands (the second hand 2, the minute hand 3, and the hour hand 4) and the liquid crystal display device 7, a time correcting process program 22*b* by which the time is automatically corrected by receiving the standard radio wave, and the like are stored in the EEPROM 22.

In a time displaying process, an error of a timing signal which is outputted from the frequency dividing circuit 14, and used for calculating the time is corrected as needed by a software process of the CPU 20 based on the timer trimming data 22*a*, so that the time calculating circuit 15 calculates the time correctly. The error of the timing signal is corrected (timing signal correcting process), for example, by counting the number of outputs of the timing signal to find an $N^{th}$ output (correction period) of the timing signal, the $N^{th}$ output by which the error is accumulated, so that the timing signal is outputted a prescribed short period of time (for example, 4 ms) earlier than it should be, and by making the frequency dividing circuit 14 insert an interval of the prescribed short period of time at the $N^{th}$ output of the timing signal. Consequently, every time a timing signal for calculating the time is outputted a prescribed short period of time earlier, its next output of the timing signal is deferred for the prescribed short period of time, and accordingly, the error of the timing signal is corrected cyclically.

The RAM 21 includes a storage region 21*a* for match-detected number memories A0 to A59 which are used to detect the marker signals (a marker signal detecting process) in a time correcting process, and a storage region 21*b* for correction period setting data which indicates the correction period in which a sampling timing of a time code signal is corrected to detect the marker signals. The match-detected number memories A0 to A59 are composed of 60 storing sections (match-detected number storing sections), and are correlated with 60 pulse positions in a frame of the time code signal, respectively.

[Time Correcting Process]

Next, the time correcting process performed in the radio-controlled timepiece 1 is described.

Figure 2:
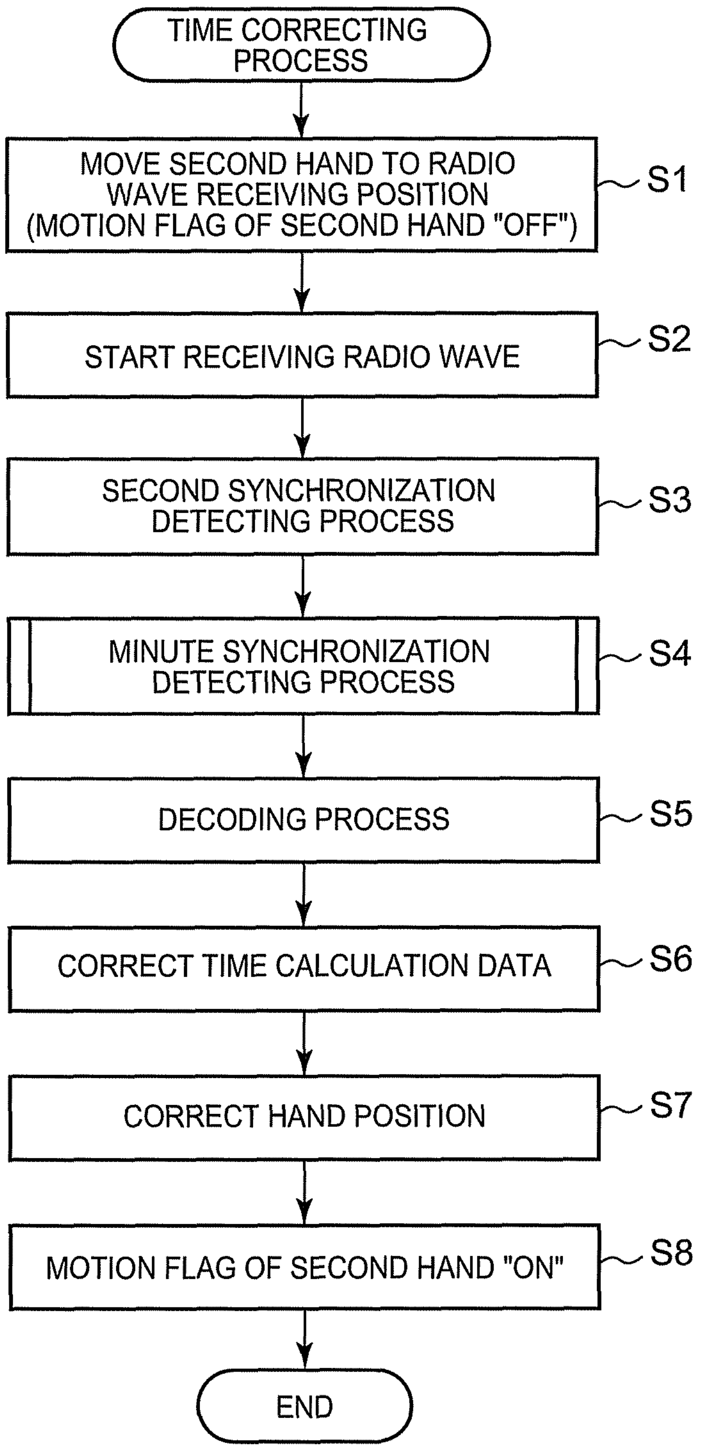
FIG. 2 is a flowchart showing steps of a time correcting process performed by a CPU.

FIG. 2 is a flowchart of the time correcting process performed by the CPU 20.

The time correcting process starts at a preset time, or at a time when a prescribed operation command is inputted through the operation section 19.

During the time correcting process, while the secondhand 2 is controlled in such a way that a motion of the second hand 2 every one second stops, the minute hand 3 and the hour hand 4 are controlled in such a way that motions of the minute hand 3 and the hour hand 4 every 10 seconds continue. Consequently, when the time correcting process starts, the CPU 20 fast-forwards the second hand 2 to a position on the dial plate, the position where it is indicated that the radio wave is being received, and then sets a motion flag of the second hand 2 in RAM 21 to OFF (Step S1). Accordingly, the motion of the second hand 2 every one second stops. On the other hand, the motions of the minute hand 3 and the hour hand 4 every 10 seconds continue as the time displaying process is performed in parallel with the time correcting process.

Next, the CPU 20 starts a receiving process by operating the radio wave receiving circuit 12 (Step S2). Consequently, the standard radio wave is received, and a time code signal represented by a high level and a low level is supplied from the radio wave receiving circuit 12 to the CPU 20.

When the time code signal is supplied, the CPU 20 performs a second synchronization detecting process by which a synchronization point for each second (a synchronization point for each of 0.0 sec. to 59.0 sec.; a second synchronization point, hereinbelow) is detected from the time code signal (Step S3). The second synchronization detecting process is performed, for example, by sampling the time code signal for a plurality of seconds, detecting a timing at which a change of the waveform (a change from a high level to a low level in a case of the Japan standard radio wave of JJY) appears, the change which appears on a one-second cycle, and then determining the timing as the second synchronization point.

When the second synchronization point is detected, the CPU 20 performs a minute synchronization detecting process by which a synchronization point for each minute (a synchronization point for x min. 00 sec., the "x" is an arbitrary value; a minute synchronization point, hereinbelow) is determined by detecting the marker signals of the time code signal based on the second synchronization point (Step S4). The minute synchronization detecting process is described below in detail.

When the second synchronization point and the minute synchronization point are detected, the CPU 20 performs a decoding process by which a code of each of pulse signals included in the time code signal is judged based on the second synchronization point and the minute synchronization point so that time information is generated (Step S5: a decoder).

When the time information is obtained by the decoding process, the CPU 20 corrects the time calculation data of the time calculating circuit 15 based on the time information (Step S6: a time correcting section). In addition, if necessary, the minute hand 3 and the hour hand 4 are fast-forwarded so that the positions thereof are corrected (Step S7). Then, the motion flag of the second hand 2 is turned to ON in order to drive the stopped second hand 2 to revolve in synchronism with the time calculation data (Step S8), and the time correcting process ends.

[Minute Synchronization Detecting Process]

Figure 11A:
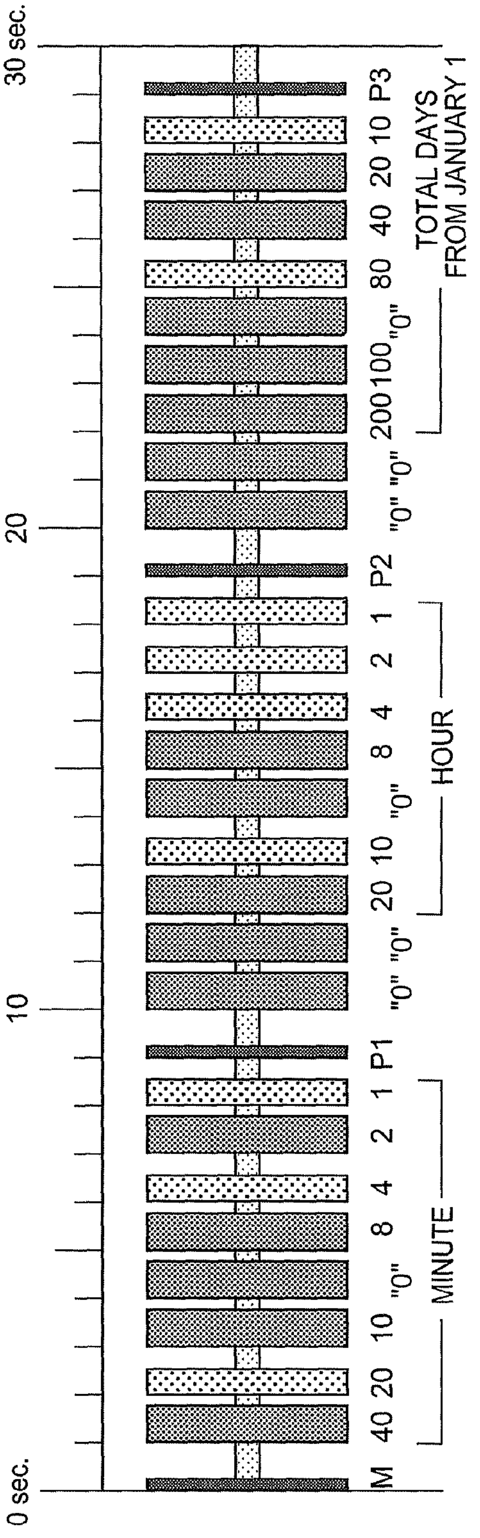
FIG. 11A and FIG. 11B are diagrams showing a format of a time code of a Japan standard radio wave.
Figure 11B:
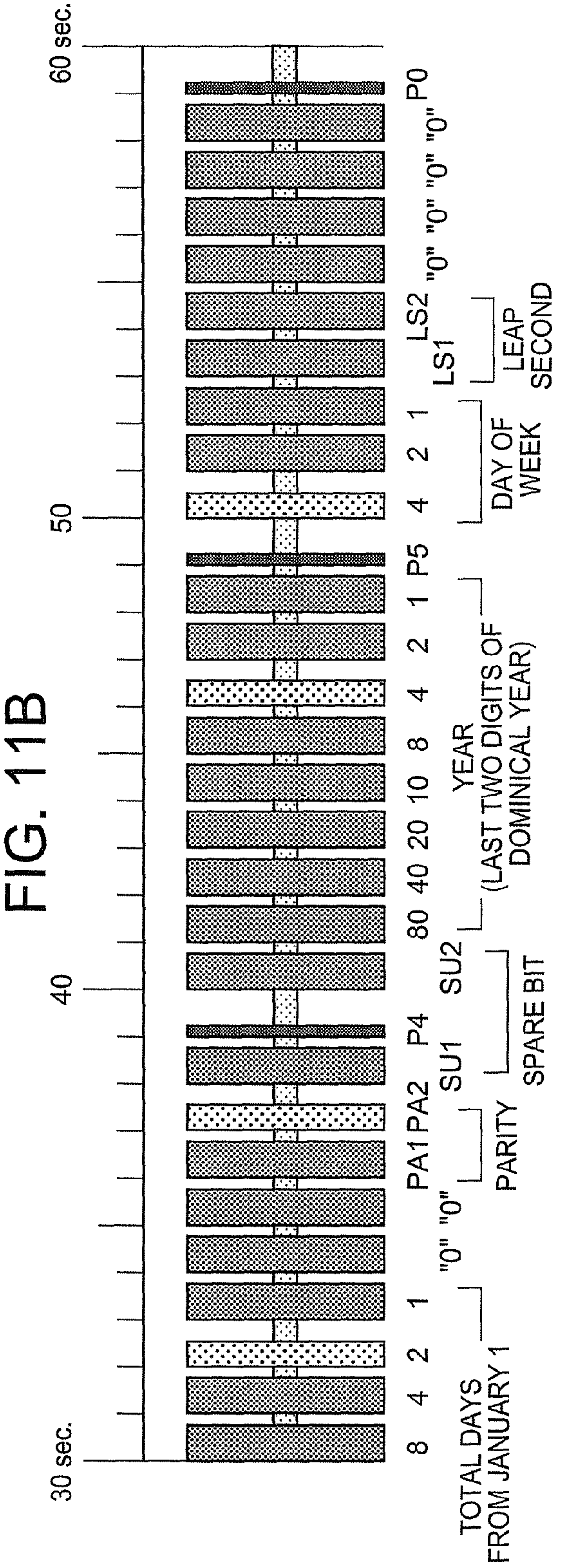

Next, the minute synchronization detecting process performed at Step S4 is described in detail. FIG. 11A and FIG. 11B are diagrams showing a format of a time code of the Japan standard radio wave of JJY.

The minute synchronization detecting process is performed by detecting the marker signals (M and P0 to P5) disposed at prescribed positions of the time code signal as shown in FIG. 11A and FIG. 11B, and determining an area where two marker signals P0 and M exist next to each other. Of the two adjacent marker signals P0 and M, the start-end of the second marker signal, i.e. the start-end of the marker signal M, is determined as the minute synchronization point.

Figure 3:
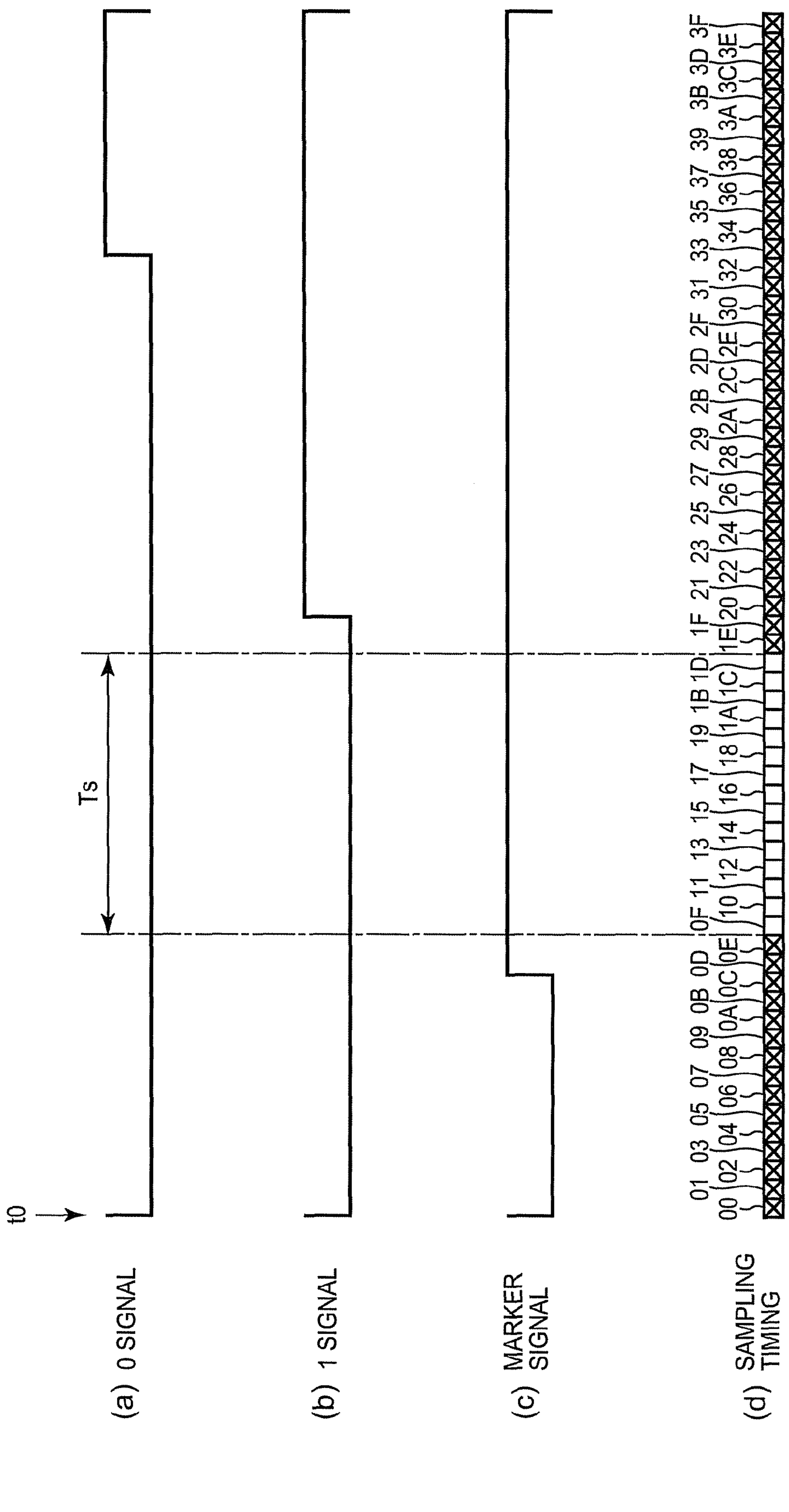
FIG. 3 is a diagram for explaining a sampling timing for a marker signal detecting process.

FIG. 3 is a diagram for explaining the sampling timing for detecting the marker signals. The part (a) of FIG. 3 shows an ideal signal waveform of a 0 signal (a pulse signal representing a code 0, i.e. a non-marker pulse signal) which is included in the time code signal. The part (b) of FIG. 3 shows an ideal signal waveform of a 1 signal (a pulse signal representing a code 1, i.e. a non-marker pulse signal) which is included in the time code signal. The part (c) of FIG. 3 shows an ideal signal waveform of a marker signal (a pulse signal representing a marker, i.e. a marker pulse signal) which is included in the time code signal. The part (d) of FIG. 3 shows whether sampling is performed or not at each of 64 portions/timings in a period of one second (the "X" represents that sampling is not performed, and the blank represents that sampling is performed).

The marker signal detecting process in the minute synchronization detecting process is performed by performing the sampling for a prescribed period of time on each of the pulse signals of the time code signal supplied from the radio wave receiving circuit 12, and calculating a match-detected number with regard to each pulse signal.

More specifically, the sampling is performed at a prescribed sampling frequency (64 Hz, for example) in a marker characteristic interval Ts where an ideal marker pulse signal is different from ideal non-marker pulse signals (a 0 signal and a 1 signal) in the signal level, as shown in FIG. 3. In an example shown in FIG. 3, one second starting from the second synchronization point t0 is divided into 64 portions "0x00 to 0x3F", and among the 64 portions, the signal level of each pulse signal is detected at each of 15 portions "0F to 1D" in the marker characteristic interval Ts so as to detect whether the signal level of each pulse signal matches the signal level of the ideal marker pulse signal at each of the 15 portions "0F to 1D" or not (a high level or a low level).

Calculating the match-detected number described above is, to be more specific, performed by counting the number of the matches (high levels in the embodiment) detected from the 15 portions "0F to 1D" with regard to each pulse signal, and adding the number of the high levels as a value of the match-detected number to a value of a match-detected number memory among match-detected number memories A0 to A59. The match-detected number memories A0 to A59 respectively correspond to the pulse positions of the pulse signals.

Then, such marker signal detecting process is repeatedly performed on each pulse signal in each of a plurality of frames (six frames, for example) of the time code signal. Here, note that the arrangement of the pulse positions is the same in any frame thereof. Accordingly, values of the match-detected number of the six frames are added up on a pulse-position-by-pulse-position basis, and the added-up value thereof with regard to each pulse position is stored in its corresponding match-detected number memory among the memories A0 to A59.

FIG. 4 shows the result of the marker signal detecting process performed on one frame of an ideal time code signal, FIG. 5 shows an exemplary result of the marker signal detecting process performed on one frame of a normal time code signal which includes noise, and FIG. 6 shows an exemplary result of the marker signal detecting process performed on six frames of the normal time code signal.

FIGS. 4 to 6 indicate that, in the embodiment, the marker signal M is disposed at a pulse position corresponding to the fourth match-detected number memory A4 which is shown by shading among the match-detected number memories A0 to A59.

When the signal level of each pulse signal of the ideal time code signal is detected at the 15 portions "0F to 1D", the signal level of each of the marker signals M and P0 to P5 thereof is detected as a high level at all the 15 portions, so that a value of the match-detected number thereof is "15". On the other hand, the signal level of each of the 0 signals and the 1 signals thereof is detected as a low level at all the 15 portions, so that a value of the match-detected number thereof is "0". Accordingly, when the process is performed on the 60 pulse signals in one frame thereof, values of the match-detected number memories A3, A4, A13, A23, A33, A43, and A53 which respectively correspond to the pulse positions of the marker signals M and P0 to P5 are "15", respectively, and values of the other match-detected number memories are "0", respectively, as shown in FIG. 4.

On the other hand, when the signal level of each pulse signal of the normal time code signal which includes noise is detected at the 15 portions "0F to 1D", the number of portions where the signal level of each of the marker signals M and P0 to P5 thereof is detected as a high level is decreased because of the influence of the noise, so that a value of the match-detected number thereof is "15" or less. On the other hand, the number of portions where the signal level of each of the 0 signals and the 1 signals thereof is detected as a high level is increased because of the influence of the noise, so that a value of the match-detected number thereof is "0" or more. Accordingly, when the process is performed on the 60 pulse signals in one frame thereof, it becomes difficult to distinguish the marker signals M and P0 to P5 from the other signals based on the values of the match-detected number memories A0 to A59, as shown in FIG. 5. The more the noise is, the more difficult the distinction becomes.

However, when the sampling is performed and the match-detected number is calculated with regard to six frames of the time code signal, the influence of the noise is reduced because values of the match-detected number of the six frames are added up, and accordingly, the marker signals M and P0 to, P5 thereof can be clearly distinguished from the other signals thereof based on the added-up values of the match-detected number memories A01 to A59, as shown in FIG. 6.

After the match-detected number is calculated with regard to the six frames, the marker signals are identified, for example, by using a threshold value by which values of the match-detected number of the marker signals can be distinguished from values of the match-detected number of the other signals, and the minute synchronization point is determined from the pulse positions (in FIG. 6, the pulse positions corresponding to the match-detected number memories A3 and A4) where two of the marker signals are disposed next to each other.

Next, control steps of the CPU 20 to perform the minute synchronization detecting process are described.

Figure 7:
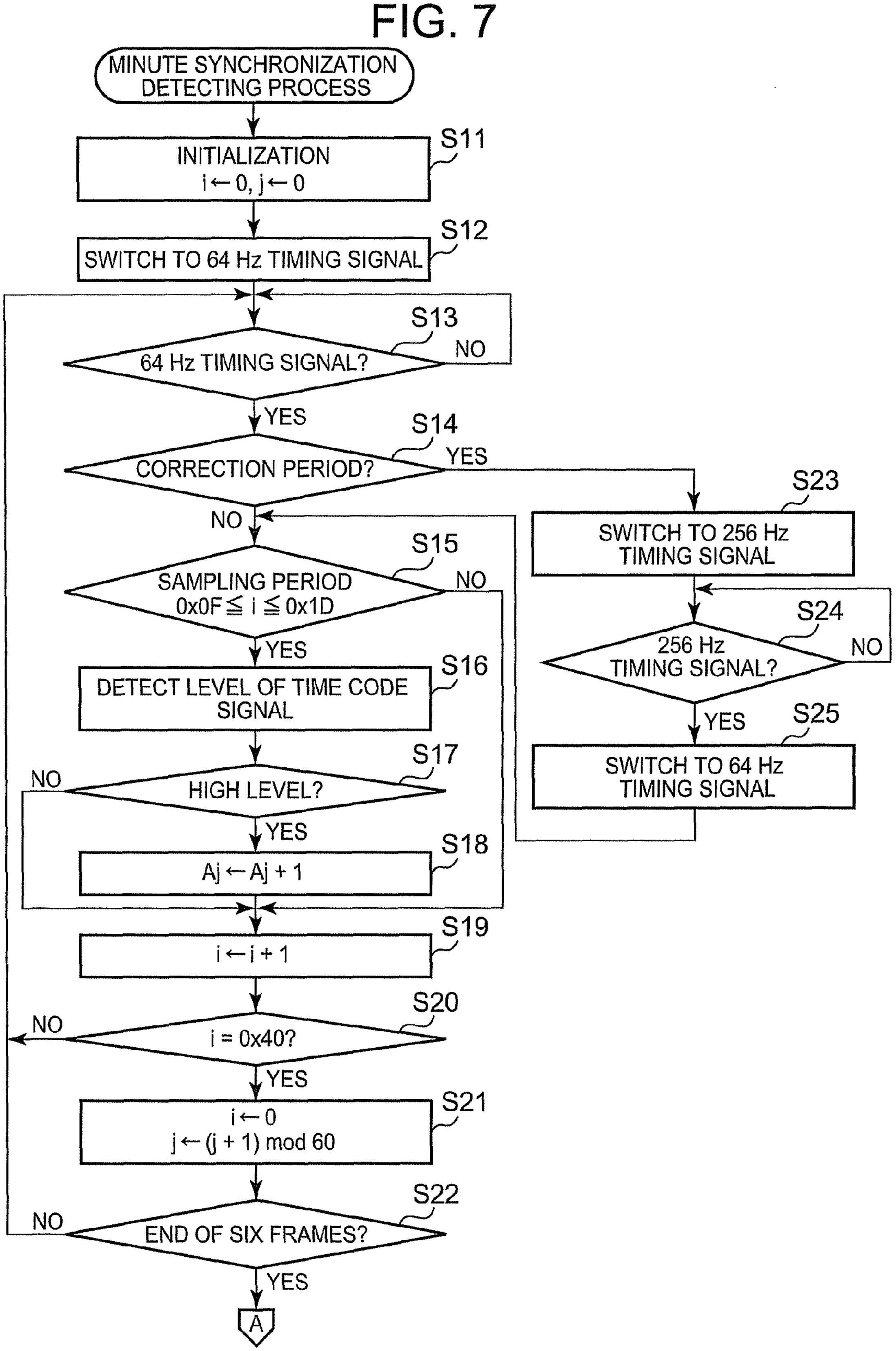
FIG. 7 is the first part of a flowchart showing steps of a minute synchronization detecting process performed at Step S4 shown in FIG. 2.
Figure 8:
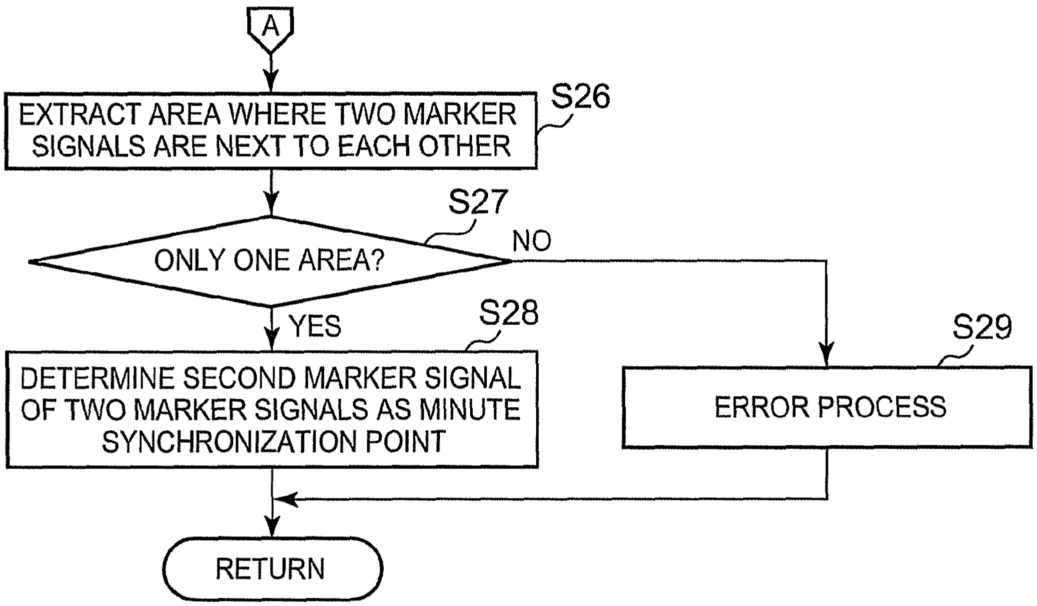
FIG. 8 is the second part of the flowchart showing steps of the minute synchronization detecting process.

FIG. 7 and FIG. 8 show a detailed flowchart of the minute synchronization detecting process performed at Step S4 shown in FIG. 2. In the flowchart, a variable i indicates each portion number of the 64 portions obtained by dividing one second which takes the second synchronization point t0 as the start-end "00", and a variable j indicates each pulse position number of the 60 pulse positions obtained by dividing one frame of the time code signal, the one frame which takes an arbitrary pulse position as a basis "0".

When the CPU 20 moves to the minute synchronization detecting process, the CPU 20 clears storage regions for various variables used for the process, and also performs initialization such as setting the second synchronization point as a starting point of the minute synchronization detecting process (Step S11). Next, the CPU 20 changes a setting of the frequency dividing circuit 14 so that a 64 Hz timing signal is supplied from the frequency dividing circuit 14 (Step S12), and then moves to a loop process (Steps S13 to S22) for performing the sampling and calculating the match-detected number with regard to each pulse signal.

When the CPU 20 moves to the loop process, the CPU 20 waits until the 64 Hz timing signal is supplied (Step S13). When the 64 Hz timing signal is supplied, the CPU 20 judges whether the present point in time is the correction period or not (Step S14). When the present point in time is not the correction period, the CPU 20 moves to Step S15. With regard to the correction period and the process (Steps S23 to S25) performed in the correction period are described below in detail.

Then, the CPU 20 judges whether the present point in time is a sampling period or not. That is, the CPU 20 judges whether the variable i indicates a value of the 15 portions "0F to 1D" (shown in the part (d) of FIG. 3) in the marker characteristic interval Ts or not (Step S15). When it is judged that the present point in time is the sampling period, the CPU 20 detects the signal level of a pulse signal of the time code signal transmitted from the radio wave receiving circuit 12 (Step S16). Taking Step S15 and Step S16 makes up a level detecting section.

Next, the CPU 20 judges whether the signal level of the pulse signal matches the signal level of the ideal marker signal or not, the signal level of the marker signal which is a high level (Step S17). When it is judged that the signal level of the pulse signal is a high level, "1" is added to a value of a match-detected number memory Aj which corresponds to the pulse position of the present pulse signal (Step S18), and the CPU 20 moves to Step S19. On the other hand, when it is judged that the signal level of the pulse signal is not a high level but a low level, the CPU 20 jumps from Step S17 to Step S19. Taking Steps S17 and S18 makes up a first calculating section and a second calculating section. When it is judged that the present point in time is not the sampling period at Step S15, the CPU 20 jumps from Step S15 to Step S19.

Then, the CPU 20 updates a value of the variable i by "+1" (Step S19), the variable i which indicates the 64 Hz portion number, and judges whether or not the value of the variable i is a value (0x40) which indicates that a period of one second is over (Step S20). When it is judged that the value of the variable i is not the value (0x40) yet, the CPU 20 returns to Step S13, and repeats the steps thereafter. On the other hand, when it is judged that the value of the variable i is the value (0x40), the CPU 20 updates the value of the variable i which indicates the 64 Hz portion number, and a value of the variable j which indicates a pulse position in a frame of the time code signal (Step S21). That is, the value of the variable i which indicates a portion number of a portion among the 64 portions into which one second is divided is reset to "00" which indicates the start-end of one second, and "+1" is added to the value of the variable j which indicates a pulse position in a frame so as to be a value thereof which indicates its next pulse position in the frame. (Note that when the value of the variable j reaches "60", it is reset to "0".)

Then, the CPU 20 judges whether six frames of the time code signal are processed or not (Step S22). When it is judged that the six frames are not processed yet, the CPU 20 returns to Step S13. When it is judged that the six frames are processed, the CPU 20 moves to its next process (Steps S26 to S29 shown in FIG. 8).

That is, by repeating a loop process of Steps S13 to S20 for a period of one second starting from the second synchronization point, the signal level of one pulse signal is detected at 64 Hz, namely, at the 15 portions "0F to 1D" among the 64 portions, and the match-detected number is calculated and a value thereof is stored in the match-detected number memory Aj which corresponds to the pulse position of the pulse signal.

Furthermore, by repeating the loop process of Steps S13 to S22, the match-detected number of each pulse signal is calculated with regard to each of the six frames of the time code signal. Also, values of the match-detected number of six pulse signals of the six frames at a same position (pulse position) in the frames are added up thereby, and the added-up value of the match-detected number is stored in its corresponding match-detected number memory among the memories A0 to A59. Consequently, the result of the process shown in FIG. 6 is obtained.

When the six frames are processed, and the CPU 20 moves to its next process (Steps S26 to S29 shown in FIG. 8), the CPU 20 compares each value of the match-detected number memories A0 to A59 with a prescribed threshold value which distinguishes the marker signals from the other signals, and extracts an area where it is judged that two marker signals are disposed next to each other based on a fact that a value equal to the threshold value or more is obtained two consecutive times (Step S26).

Then, the CPU 20 judges whether or not there is only one area where two marker signals are disposed next to each other (Step S27). When it is judged that there is only one area, the CPU 20 judges that the marker signals are properly detected, and of the two marker signals, the start-end of the second marker signal is determined as the minute synchronization point (00 sec.) (Step S28). On the other hand, when it is judged that there is not only one area, the CPU 20 judges that the marker signals are not properly detected, and performs an error process (Step S29). Taking Steps S26 to S29 makes up a marker determining section. The CPU 20 ends the minute synchronization detecting process, and returns to the time correcting process.

[Timing Signal Correcting Process]

Next, the correction period which is judged at Step S14 and the timing signal correcting process (Steps S23 to S25) which is performed in the correction period are described. Taking Steps S14 and S23 to S25 makes up a timing correcting section.

Figures 10A, 10B, 10C:
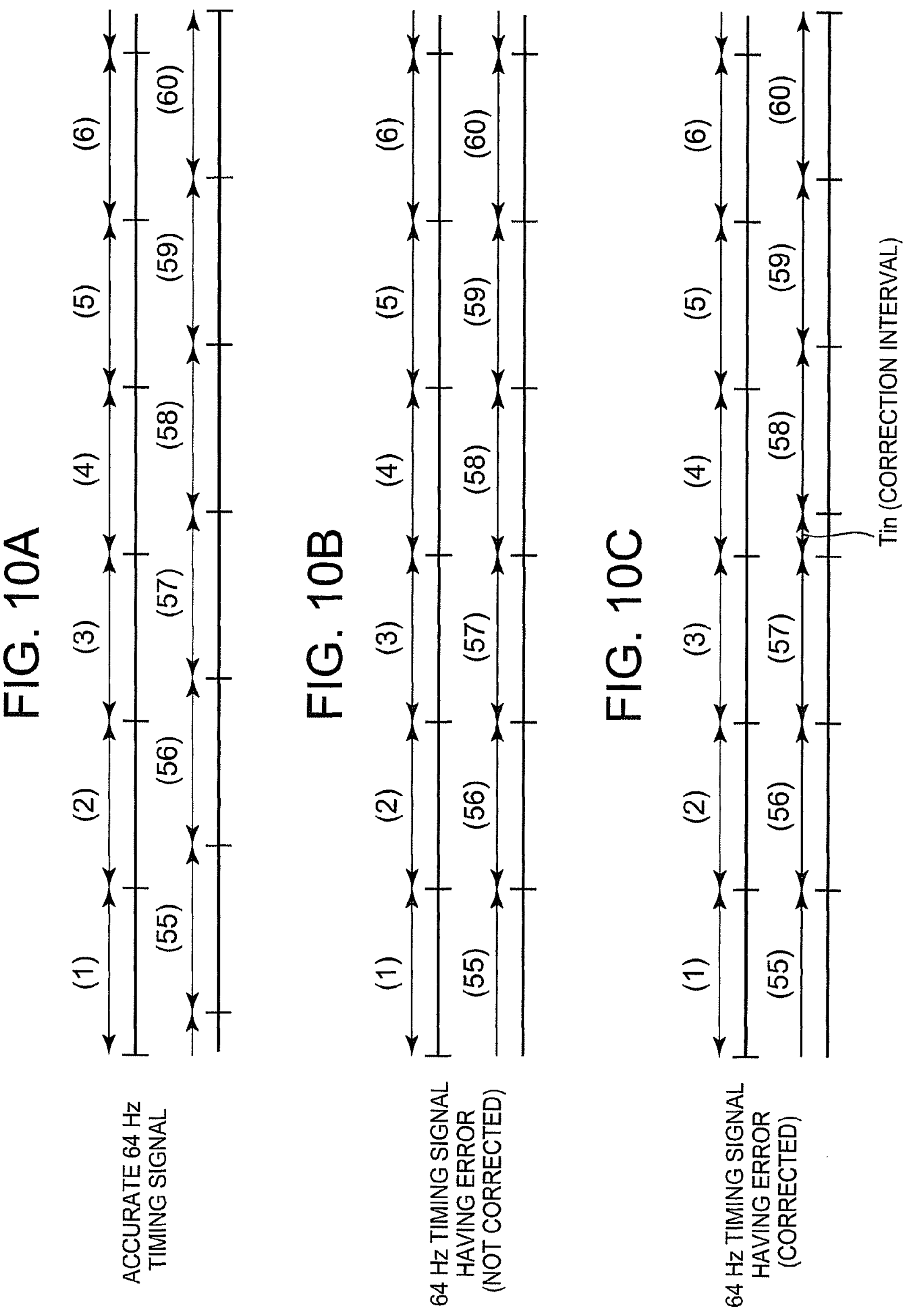
FIG. 10A to FIG. 10C are diagrams for explaining how to correct the sampling timing.

FIG. 10A to FIG. 10C are diagrams for explaining how to correct the sampling timing. FIG. 10A shows the start-part (the $1^{st}$ to $6^{th}$ output intervals) and the end-part (the $55^{th}$ to $60^{th}$ output intervals) of 60 output intervals of an accurate 64 Hz timing signal. FIG. 10B shows the start-part (the $1^{st}$ to $6^{th}$ output intervals) and the end-part (the $55^{th}$ to $60^{th}$ output intervals) of 60 output intervals of a 64 Hz timing signal having an error. FIG. 10C shows the start-part (the $1^{st}$ to $6^{th}$ output intervals) and the end-part (the $55^{th}$ to $60^{th}$ output intervals) of 60 output intervals of the 64 Hz timing signal having an error on which the timing signal correcting process is performed.

In a case where there is, for example, an error of about 100 ppm (parts per million) in an oscillating frequency of the oscillation circuit 13, when a 64 Hz timing signal having the error is kept being outputted, a difference which cannot be ignored is produced in outputting the timing signal, as it is known by comparing FIG. 10A with FIG. 10B. For example, when the 64 Hz timing signal having the error is kept being outputted for six minutes, at the end, a difference of 36 ms is produced in outputting as compared with an accurate 64 Hz timing signal. The difference is more than a length of two cycles of 64 Hz. Consequently, it is possible that the difference exerts a bad influence on the marker signal detecting process.

Therefore, in the minute synchronization detecting process according to the embodiment, as shown in FIG. 10C, before the difference becomes too large, for example, every time the difference reaches a length of one cycle of 256 Hz (4 ms), a 256 Hz dividing operation is inserted into a 64 Hz dividing operation of the frequency dividing circuit 14. That is, by inserting a correction interval Tin, further increase of the difference in outputting the timing signal is avoided. By performing such timing signal correcting process, even in the case where the 64 Hz timing signal having the error is kept being outputted for six minutes, the difference between the timing signal and the accurate 64 Hz timing signal in outputting can be controlled to be within a small range (within −4 ms, for example).

The period ($N^{th}$ output of the timing signal) by which the difference in outputting the 64 Hz timing signal having the error reaches a length (4 ms) of one cycle of 256 Hz is stored in the RAM 21 by the correction data setting process described below, and the correction period is determined based on the correction period setting data.

Such timing signal correcting process is performed at Steps S14 and S23 to S25 of the minute synchronization detecting process (shown in FIG. 7). That is, at Step S14, the CPU 20 judges based on the correction period setting data stored in the storing region 21*b* whether or not the present point in time is the correction period by which the difference in outputting the 64 Hz timing signal reaches a length of one cycle of 256 Hz. When it is judged that the present point in time is the correction period, the CPU 20 switches the frequency-dividing ratio of the frequency dividing circuit 14 to 256 Hz (Step S23), and waits until a 256 Hz timing signal is inputted (Step S24). When the 256 Hz timing signal is inputted one time, the CPU 20 switches the frequency-dividing ratio of the frequency dividing circuit 14 to 64 Hz (Step S25), and returns to Step S15. By such process, the correction of the 64 Hz timing signal shown in FIG. 10C is achieved.

Figure 9:
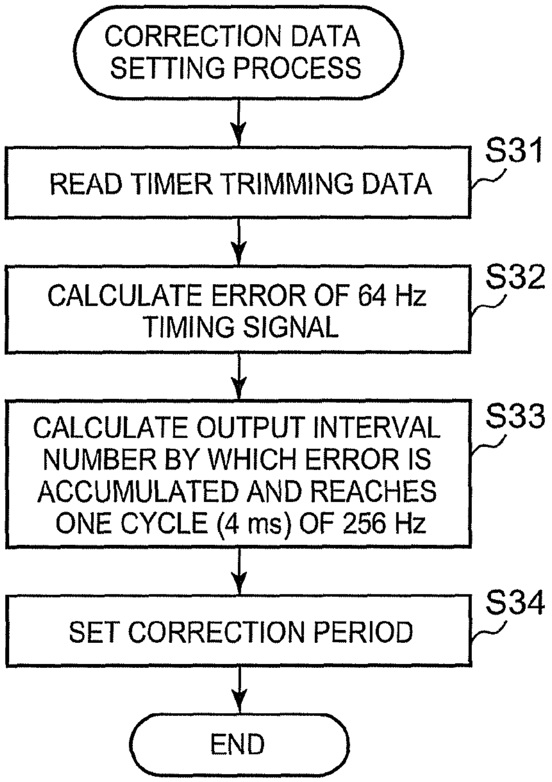
FIG. 9 is a flowchart showing control steps of a correction data setting process by which a correction period is obtained.

FIG. 9 is a flowchart of the correction data setting process by which the correction period is obtained.

The correction data setting process is performed, for example, when an operation of the radio-controlled timepiece 1 starts (when a battery is put). When the correction data setting process starts, the CPU 20 reads the timer trimming data 22*a* of the EEPROM 22 (Step S31), and calculates an error of a 64 Hz timing signal from the data (Step S32). Then, the number of output intervals (output interval number) is calculated, the output interval number by which the error obtained at Step S32 is accumulated, and reaches one cycle (4 ms) of 256 Hz (Step S33). The output interval number is stored in the storage region 21*b* of the RAM 21 as the correction period setting data (Step S34).

By the process, even when an error of the oscillation circuit 13 is different depending on a radio-controlled timepiece, a proper correction period is calculated based on the timer trimming data 22*a* which indicates the error. Accordingly, an error of the sampling timing which is for the minute synchronization detecting process can be properly corrected.

As described above, according to the radio-controlled timepiece 1 and the minute synchronization detecting process in the embodiment of the present invention, with regard to each pulse signal in each frame of the time code signal, the match-detected number is calculated and a value thereof is stored in its corresponding match-detected number memory among the memories A0 to A59. In addition, values of the match-detected number of the frames of the time code signal are added up on a pulse-position-by-pulse-position basis every time one frame thereof is processed. Owing to the added-up value of the match-detected number on a pulse-position-by-pulse-position basis, the influence of the noise is reduced, and accordingly, the marker signals can be accurately detected.

Furthermore, the match-detected number indicates the number of matches between each pulse signal and the ideal marker signal in the signal level, the matches which are detected from the plurality of points (portions) in the marker characteristic interval Ts. Accordingly, as compared with a case where sampling data in the whole time length of each pulse signal is stored as it is, and a data process is performed based thereon, the capacity of the RAM 21 necessary for storing data as well as the load of the data process can be substantially reduced.

Furthermore, according to the radio-controlled timepiece 1 and the minute synchronization detecting process in the embodiment of the present invention, the 60 match-detected number memories A0 to A59 are included, the memories A0 to A59 which respectively correspond to the 60 pulse positions in any of the frames of the time code signal, and values of the match-detected number of the frames of the time code signal are added up on a pulse-position-by-pulse-position basis, and stored in the corresponding match-detected number memories A0 to A59, respectively. Accordingly, the capacity of a data storage used for the marker signal detecting process can be very small.

Furthermore, in the radio-controlled timepiece 1 according to the embodiment of the present invention, the time code signal is sampled in the marker characteristic interval Ts at a prescribed frequency, whereby the signal level is detected at the plurality of points (portions). Consequently, the signal level of each pulse signal is detected at an equal timing, which contributes to accurate marker signal detection.

Furthermore, in the radio-controlled timepiece 1 according to the embodiment, the error of the sampling timing signal is corrected by the timing signal correcting process performed at Steps S14 and S23 to S25 shown in FIG. 7 so that the difference in outputting the timing signal does not become too large. Accordingly, it can be avoided that the error of the oscillation circuit 13 exerts a bad influence on the marker signal detecting process.

Furthermore, the timing signal for the sampling is corrected by making the frequency dividing circuit 14 perform a prescribed frequency-dividing operation of one cycle in each correction period so that the correction interval Tin is inserted, the correction period by which the difference in outputting the timing signal reaches a prescribed period of time. Accordingly, the load of the timing signal correcting process becomes very light.

The present invention is not limited to the embodiment described above, and hence various modifications are available. For example, in the embodiment, the number of matches between the signal level of each pulse signal and the signal level of the ideal marker signal is counted, and a counted value thereof is stored in its corresponding match-detected number memory among the memories A0 to A59. Instead, the number of mismatches between the signal level of each pulse signal and the signal level of the ideal marker signal may be counted, and an area where a counted value thereof is small may be extracted as the pulse position of a marker signal.

Furthermore, in the embodiment, as a method for detecting the signal level in the marker characteristic interval Ts, the time code signal is sampled on a prescribed cycle. Instead of the prescribed cycle, the signal level may be detected at a plurality of arbitrary timings in the marker characteristic interval Ts. Furthermore, in the embodiment, the time code signal is a binary signal of a high level and a low level. However, the time code signal may be a demodulated analog signal, and the CPU 20 may take in a multilevel signal which is obtained by A/D conversion of the demodulated analog signal. In this case, when the signal level of a pulse signal is within a prescribed allowable error range from the signal level of the ideal marker signal, the signal level of the pulse signal may be regarded as a signal level which matches the signal level of the marker signal.

Furthermore, in the embodiment, as a method for determining an area where a marker signal exists based on a value of each of the match-detected number memories A0 to A59, a value of the match-detected number is compared with a threshold value on a pulse-position-by-pulse position basis, and whether each pulse position is a position of a marker signal or not is judged based thereon. However, this is not a limit. Various methods may be adopted for the determination.

Furthermore, in the embodiment, as a method for correcting the error of the timing signal for the sampling, an output of the timing signal is deferred for a prescribed period of time every time the difference in outputting the timing signal reaches the prescribed period of time. However, this is not a limit, and hence can be modified in various ways. For example, a method may be adopted therefor, the method by which whenever the timing signal is outputted for a prescribed number of times, its next output of the timing signal is deferred for a period of time which corresponds to the amount of the difference in outputting the timing signal, the difference which is accumulated during the prescribed number of times the timing signal is outputted.

Furthermore, in the embodiment, the marker signals are detected from the Japan standard radio wave of JJY. However, the marker signals can be detected by the same process described above from another standard radio wave such as the U.S. standard radio wave of WWVB. That is, it can be performed by changing the design of the marker characteristic interval in such a way as to fit a target standard radio wave, the marker characteristic interval where the marker signals and the other signals are different in the signal level. Furthermore, the details of the embodiment of the present invention can be appropriately modified without departing from the scope of the present invention, the details such as the number of frames of the time code signal, the frames which are subjected to the marker signal detecting process, the sampling frequency, the number of portions for the sampling, and a time length to be corrected each time the error of the timing signal is corrected.

This application is based upon and claims the benefit of priority under 35 USC 119 of Japanese Patent Application No. 2010-161159 filed on Jul. 16, 2010, the entire disclosure of which, including the description, claims, drawings, and abstract, is incorporated herein by reference in its entirety.

What is claimed is:

1. A marker detecting apparatus comprising:

a signal input section adapted for receiving a time code signal, the time code signal having a plurality of frames each of which includes a plurality of pulse signals cyclically disposed, each pulse signal being either one of a marker pulse signal and a non-marker pulse signal, the marker pulse signal being disposed at a prescribed position in any of the frames;

a level detecting section adapted for detecting, for each of the pulse signals in each of the frames, a signal level of the pulse signal at a plurality of points included in a marker characteristic period when an ideal marker pulse signal and an ideal non-marker pulse signal are presumed to be different in the signal level, so as to detect a match between the pulse signal and the ideal marker pulse signal in the signal level;

a calculating section adapted for calculating, for each of the pulse signals in each of the frames, a match-detected number indicating a number of the matches detected by the level detecting section within the marker characteristic period of the pulse signal;

a plurality of memory spaces each adopted for storing the match-detected number for one of the pulse signals in association with a pulse position within one frame, the pulse position corresponding to an order of the pulse signal within the one frame;

an adding section adapted for adding the match-detected numbers each corresponding to the pulse position having a same order within each of the frames; and a marker determining section adapted for determining at which pulse position in the frames the marker pulse signal is disposed, based on the added match-detected number within each of the frames.

2. A radio-controlled timepiece comprising:

the marker detecting apparatus according to claim 1;

a time calculating section adapted for calculating time;

a radio wave receiving section adapted for receiving a standard radio wave so as to output the time code signal;

a decoder adapted for decoding the time code signal based on the marker pulse signal detected by the marker detecting apparatus so as to generate time information; and a time correcting section adapted for correcting the time calculated by the time calculating section based on the time information generated by the decoder.

3. The marker detecting apparatus according to claim 1, wherein the level detecting section is further adapted for detecting the signal level of the time code signal for a prescribed sampling period set in the marker characteristic period on a prescribed sampling cycle.

4. A radio-controlled timepiece comprising:

the marker detecting apparatus according to claim 3;

a time calculating section adapted for calculating time;

a radio wave receiving section adapted for receiving a standard radio wave so as to output the time code signal;

a decoder adapted for decoding the time code signal based on the marker pulse signal detected by the marker detecting apparatus so as to generate time information; and a time correcting section adapted for correcting the time calculated by the time calculating section based on the time information generated by the decoder.

5. The marker detecting apparatus according to claim 3 further comprising:

a timer circuit adapted for generating a timing signal for informing the level detecting section of the sampling cycle;

an error information storing section adapted for storing error information indicating a timing error of the timer circuit; and a timing correcting section adapted for correcting a difference in outputting the timing signal based on the error information, the difference which is produced by the timing error.

6. A radio-controlled timepiece comprising:

the marker detecting apparatus according to claim 5;

a time calculating section adapted for calculating time;

a radio wave receiving section adapted for receiving a standard radio wave so as to output the time code signal;

a decoder adapted for decoding the time code signal based on the marker pulse signal detected by the marker detecting apparatus so as to generate time information; and a time correcting section adapted for correcting the time calculated by the time calculating section based on the time information generated by the decoder.

7. The marker detecting apparatus according to claim 5, wherein the timing correcting section is further adapted for making the timer circuit insert a correction interval at every preset correction period while the timer circuit repeatedly outputs the timing signal so as to correct the difference in outputting the timing signal.

8. A radio-controlled timepiece comprising:

the marker detecting apparatus according to claim 7;

a time calculating section adapted for calculating time;

a radio wave receiving section adapted for receiving a standard radio wave so as to output the time code signal;

a decoder adapted for decoding the time code signal based on the marker pulse signal detected by the marker detecting apparatus so as to generate time information; and a time correcting section adapted for correcting the time calculated by the time calculating section based on the time information generated by the decoder.

* * * * *